(12) United States Patent
Da Palma et al.

(10) Patent No.: US 8,594,305 B2
(45) Date of Patent: Nov. 26, 2013

(54) ENHANCING CONTACT CENTERS WITH DIALOG CONTRACTS

(75) Inventors: William V. Da Palma, Coconut Creek, FL (US); Baiju D. Mandalia, Boca Raton, FL (US); Victor S. Moore, Lake City, FL (US); Wendi L. Nusbickel, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 1705 days.

(21) Appl. No.: 11/684,333

(22) Filed: Mar. 9, 2007

(65) Prior Publication Data

US 2008/0152121 A1    Jun. 26, 2008

Related U.S. Application Data

(63) Continuation-in-part of application No. 11/680,304, filed on Feb. 28, 2007, and a continuation-in-part of application No. 11/615,856, filed on Dec. 22, 2006.

(51) Int. Cl.
*H04M 1/64* (2006.01)

(52) U.S. Cl.
USPC ................................ 379/265.07; 379/88.08

(58) Field of Classification Search
USPC ............... 379/265.12, 265.01–265.09, 88.01, 379/88.08–88.09
See application file for complete search history.

(56) References Cited

U.S. PATENT DOCUMENTS 5,278,943 A    1/1994    Casper et al.
(Continued)

FOREIGN PATENT DOCUMENTS

CN    1697419    11/2005
EP    1199872    4/2002
(Continued)

OTHER PUBLICATIONS

Atkins, D., et al., "Common Presence and Instant Messaging: Message Format," [online] Internet Engineering Task Force, IETF, CH, vol. IMPP, No. 8, Jan. 9, 2003, [retrieved on Feb. 7, 2008] retrieved from the Internet: <http://tools.ietf.org/html/draft-ietf-impp-cpim-msgfmt-08>.

(Continued)

*Primary Examiner* — Fan Tsang
*Assistant Examiner* — Jirapon Intavong
(74) *Attorney, Agent, or Firm* — Patents on Demand P.A.; Brian K. Buchheit; Scott M. Garrett (57) ABSTRACT

The present solution can include a method for using dialog contracts for contact center interactions. The method can include a step of determining a context that applies to a caller who is communicating with a contact center. A dialog contract can be identified that corresponds to the determined context. The dialog contract can specify requirements for a real-time contact center session. The contact center can transfer the caller to a contact center agent. The real-time communication session can be conducted. A software program, referred to as an agent monitor, can analyze input of the caller and the contact center agent during the communication session and can automatically update a session file as requirements of the dialog contract are satisfied. The session file can be used as a quality measurement of the communication session.

20 Claims, 5 Drawing Sheets

(56) References Cited

U.S. PATENT DOCUMENTS

| | | | |
|---|---|---|---|
| 5,774,551 A | 6/1998 | Wu et al. | |
| 5,781,720 A | 7/1998 | Parker et al. | |
| 5,873,094 A | 2/1999 | Talatik | |
| 6,049,779 A * | 4/2000 | Berkson | 705/14.39 |
| 6,058,163 A * | 5/2000 | Pattison et al. | 379/265.06 |
| 6,195,697 B1 | 2/2001 | Bowman-Amuah | |
| 6,269,336 B1 | 7/2001 | Ladd et al. | |
| 6,272,625 B1 | 8/2001 | DeCarmo | |
| 6,298,370 B1 | 10/2001 | Tang et al. | |
| 6,301,609 B1 | 10/2001 | Aravamudan et al. | |
| 6,314,177 B1 | 11/2001 | Davis et al. | |
| 6,317,794 B1 | 11/2001 | Papierniak et al. | |
| 6,338,089 B1 | 1/2002 | Quinlan | |
| 6,351,271 B1 | 2/2002 | Mainwaning et al. | |
| 6,366,771 B1 | 4/2002 | Angle et al. | |
| 6,370,508 B2 | 4/2002 | Beck et al. | |
| 6,424,995 B1 | 7/2002 | Shuman | |
| 6,442,547 B1 | 8/2002 | Bowman-Amuah et al. | |
| 6,523,035 B1 | 2/2003 | Fleming et al. | |
| 6,587,558 B2 | 7/2003 | Lo et al. | |
| 6,606,744 B1 | 8/2003 | Mikurak | |
| 6,611,867 B1 | 8/2003 | Bowman-Amuah | |
| 6,618,490 B1 | 9/2003 | Cham et al. | |
| 6,662,340 B2 | 12/2003 | Rawat et al. | |
| 6,704,396 B2 | 3/2004 | Parolkar et al. | |
| 6,724,403 B1 | 4/2004 | Santoro et al. | |
| 6,735,287 B2 | 5/2004 | Vishnik et al. | |
| 6,735,566 B1 | 5/2004 | Brand | |
| 6,757,362 B1 | 6/2004 | Cooper et al. | |
| 6,810,429 B1 | 10/2004 | Walsh et al. | |
| 6,895,084 B1 | 5/2005 | Saylor et al. | |
| 6,898,277 B1 | 5/2005 | Meteer et al. | |
| 6,898,658 B2 | 5/2005 | Toguchi et al. | |
| 6,910,074 B1 | 6/2005 | Amin et al. | |
| 6,922,466 B1 | 7/2005 | Peterson et al. | |
| 6,970,554 B1 | 11/2005 | Peterson et al. | |
| 6,972,761 B1 | 12/2005 | Cox et al. | |
| 6,978,247 B1 | 12/2005 | Bogart et al. | |
| 6,988,126 B2 | 1/2006 | Wilcock et al. | |
| 6,996,605 B2 | 2/2006 | Low et al. | |
| 7,003,079 B1 | 2/2006 | McCarthy et al. | |
| 7,006,605 B1 | 2/2006 | Morganstein et al. | |
| 7,023,840 B2 | 4/2006 | Golla et al. | |
| 7,085,728 B2 | 8/2006 | Sarlay et al. | |
| 7,149,798 B2 | 12/2006 | Rezvani et al. | |
| 7,177,881 B2 | 2/2007 | Schwesig et al. | |
| 7,203,907 B2 | 4/2007 | Weng et al. | |
| 7,210,098 B2 | 4/2007 | Sibal et al. | |
| 7,233,933 B2 | 6/2007 | Horvitz et al. | |
| 7,286,480 B2 | 10/2007 | Carpenter et al. | |
| 7,286,840 B2 | 10/2007 | Jain | |
| 7,315,616 B2 | 1/2008 | Annadata et al. | |
| 7,330,487 B2 | 2/2008 | Chang et al. | |
| 7,334,018 B2 | 2/2008 | Elms | |
| 7,336,628 B2 | 2/2008 | Chang et al. | |
| 7,337,405 B2 | 2/2008 | Weng et al. | |
| 7,356,567 B2 | 4/2008 | Odell et al. | |
| 7,386,467 B2 * | 6/2008 | Eitel et al. | 705/7.42 |
| 7,418,094 B2 | 8/2008 | Golitisin et al. | |
| 7,441,261 B2 | 10/2008 | Slater et al. | |
| 7,499,458 B2 | 3/2009 | McDysan et al. | |
| 7,506,368 B1 | 3/2009 | Kersey et al. | |
| 7,525,937 B2 | 4/2009 | O'Neill | |
| 7,567,662 B1 | 7/2009 | Renner et al. | |
| 7,644,351 B1 | 1/2010 | Portnoy et al. | |
| 7,739,115 B1 * | 6/2010 | Pettay et al. | 704/270 |
| 2001/0027474 A1 | 10/2001 | Nachman et al. | |
| 2001/0034738 A1 | 10/2001 | Cantwell et al. | |
| 2001/0052023 A1 | 12/2001 | Lin et al. | |
| 2002/0016736 A1 | 2/2002 | Cannon et al. | |
| 2002/0052932 A1 | 5/2002 | Curtis et al. | |
| 2002/0055350 A1 | 5/2002 | Gupte et al. | |
| 2002/0055967 A1 | 5/2002 | Coussement | |
| 2002/0056000 A1 | 5/2002 | Coussement | |
| 2002/0089539 A1 | 7/2002 | Lindhorst et al. | |
| 2002/0099602 A1 | 7/2002 | Moskowitz et al. | |
| 2002/0103867 A1 | 8/2002 | Schilter | |
| 2002/0105909 A1 | 8/2002 | Flanagan et al. | |
| 2002/0120674 A1 | 8/2002 | Son et al. | |
| 2002/0140731 A1 | 10/2002 | Subramaniam et al. | |
| 2002/0154162 A1 | 10/2002 | Bhatia et al. | |
| 2002/0169613 A1 | 11/2002 | Damiba | |
| 2002/0174170 A1 * | 11/2002 | Ioffe et al. | 709/201 |
| 2002/0184346 A1 | 12/2002 | Mani | |
| 2002/0184373 A1 | 12/2002 | Maes | |
| 2002/0184610 A1 | 12/2002 | Chong et al. | |
| 2002/0187750 A1 | 12/2002 | Majumdar | |
| 2002/0194388 A1 | 12/2002 | Boloker et al. | |
| 2003/0007606 A1 | 1/2003 | Suder et al. | |
| 2003/0023953 A1 | 1/2003 | Lucassen et al. | |
| 2003/0026269 A1 | 2/2003 | Paryani | |
| 2003/0040995 A1 | 2/2003 | Daddario et al. | |
| 2003/0041108 A1 | 2/2003 | Henrick et al. | |
| 2003/0046088 A1 | 3/2003 | Yuschik | |
| 2003/0055884 A1 | 3/2003 | Yuen et al. | |
| 2003/0088421 A1 | 5/2003 | Maes et al. | |
| 2003/0095540 A1 | 5/2003 | Mulligan et al. | |
| 2003/0108063 A1 | 6/2003 | Joseph et al. | |
| 2003/0110297 A1 | 6/2003 | Tabatabai et al. | |
| 2003/0120813 A1 | 6/2003 | Majumdar et al. | |
| 2003/0156706 A1 | 8/2003 | Koehler et al. | |
| 2003/0182622 A1 | 9/2003 | Sibal et al. | |
| 2003/0187944 A1 | 10/2003 | Johnson et al. | |
| 2003/0204561 A1 | 10/2003 | Briscoe et al. | |
| 2003/0212762 A1 | 11/2003 | Barnes et al. | |
| 2003/0223381 A1 | 12/2003 | Schroderus | |
| 2004/0039795 A1 | 2/2004 | Percival | |
| 2004/0054740 A1 | 3/2004 | Daigle et al. | |
| 2004/0078787 A1 | 4/2004 | Borek et al. | |
| 2004/0080535 A1 * | 4/2004 | Lueckhoff et al. | 345/758 |
| 2004/0104938 A1 | 6/2004 | Saraswat et al. | |
| 2004/0128342 A1 | 7/2004 | Maes et al. | |
| 2004/0133888 A1 | 7/2004 | Ard et al. | |
| 2004/0146010 A1 | 7/2004 | Gass et al. | |
| 2004/0162726 A1 | 8/2004 | Chang | |
| 2004/0172254 A1 | 9/2004 | Sharma et al. | |
| 2004/0172258 A1 | 9/2004 | Dominach et al. | |
| 2004/0181461 A1 | 9/2004 | Raiyani et al. | |
| 2004/0199529 A1 | 10/2004 | Clark et al. | |
| 2004/0199574 A1 | 10/2004 | Franco et al. | |
| 2004/0205614 A1 | 10/2004 | Keswa | |
| 2004/0208307 A1 * | 10/2004 | Walker et al. | 379/265.01 |
| 2004/0215824 A1 | 10/2004 | Payrits | |
| 2004/0218751 A1 * | 11/2004 | Colson et al. | 379/265.09 |
| 2004/0230466 A1 | 11/2004 | Davis et al. | |
| 2004/0239754 A1 | 12/2004 | Shachar | |
| 2004/0250201 A1 | 12/2004 | Caspi | |
| 2004/0254957 A1 | 12/2004 | Hyotyniemi et al. | |
| 2004/0255030 A1 | 12/2004 | Sillanpaa | |
| 2005/0021826 A1 | 1/2005 | Kumar | |
| 2005/0027495 A1 | 2/2005 | Matichuk | |
| 2005/0047579 A1 | 3/2005 | Salame | |
| 2005/0055213 A1 * | 3/2005 | Claudatos et al. | 704/270.1 |
| 2005/0060138 A1 | 3/2005 | Wang et al. | |
| 2005/0069225 A1 | 3/2005 | Schneider et al. | |
| 2005/0102606 A1 | 5/2005 | Sasaki et al. | |
| 2005/0105712 A1 * | 5/2005 | Williams et al. | 379/265.02 |
| 2005/0125541 A1 | 6/2005 | Frank et al. | |
| 2005/0129198 A1 | 6/2005 | Sudhir et al. | |
| 2005/0132023 A1 | 6/2005 | Cazzolla et al. | |
| 2005/0136897 A1 | 6/2005 | Praveenkumar et al. | |
| 2005/0137875 A1 | 6/2005 | Kim et al. | |
| 2005/0147216 A1 | 7/2005 | Janakiraman et al. | |
| 2005/0152522 A1 | 7/2005 | Kumhyr | |
| 2005/0172331 A1 | 8/2005 | Blackketter et al. | |
| 2005/0195823 A1 | 9/2005 | Chen et al. | |
| 2005/0198099 A1 | 9/2005 | Motsinger et al. | |
| 2005/0203944 A1 | 9/2005 | Dinh et al. | |
| 2005/0251393 A1 | 11/2005 | Georgescu | |
| 2005/0261909 A1 | 11/2005 | Sienel et al. | |
| 2005/0278444 A1 | 12/2005 | Sims et al. | |
| 2005/0283364 A1 | 12/2005 | Longe et al. | |
| 2005/0286705 A1 | 12/2005 | Contolini et al. | |
| 2005/0286707 A1 * | 12/2005 | Erhart et al. | 379/265.07 |

| | | | |
|---|---|---|---|
| 2006/0015600 A1 | 1/2006 | Piper | |
| 2006/0023864 A1 | 2/2006 | Krahn | |
| 2006/0023865 A1 | 2/2006 | Nice et al. | |
| 2006/0031077 A1 | 2/2006 | Dalton et al. | |
| 2006/0036770 A1 | 2/2006 | Hosn et al. | |
| 2006/0069563 A1 | 3/2006 | Ju et al. | |
| 2006/0074980 A1 | 4/2006 | Sarkar | |
| 2006/0101143 A1 | 5/2006 | Garcia et al. | |
| 2006/0104433 A1 | 5/2006 | Simpson et al. | |
| 2006/0112400 A1 | 5/2006 | Zhang et al. | |
| 2006/0126816 A1 | 6/2006 | Shaffer et al. | |
| 2006/0168002 A1 | 7/2006 | Chesley | |
| 2006/0176901 A1 | 8/2006 | Terai et al. | |
| 2006/0182258 A1 | 8/2006 | Sisselman et al. | |
| 2006/0190580 A1 | 8/2006 | Shu et al. | |
| 2006/0195584 A1 | 8/2006 | Baumann | |
| 2006/0200589 A1 | 9/2006 | Collins et al. | |
| 2006/0200754 A1 | 9/2006 | Kablesh et al. | |
| 2006/0212511 A1 | 9/2006 | Garcia-Martin | |
| 2006/0282856 A1 | 12/2006 | Errico et al. | |
| 2006/0287866 A1 | 12/2006 | Cross et al. | |
| 2007/0005990 A1 | 1/2007 | Sathish | |
| 2007/0026852 A1 | 2/2007 | Logan et al. | |
| 2007/0047715 A1 | 3/2007 | Madhusudan et al. | |
| 2007/0049281 A1 | 3/2007 | Chen et al. | |
| 2007/0071224 A1* | 3/2007 | Shtivelman et al. | 379/265.02 |
| 2007/0081557 A1 | 4/2007 | Binetti et al. | |
| 2007/0100981 A1 | 5/2007 | Adamczyk et al. | |
| 2007/0109979 A1 | 5/2007 | Fu et al. | |
| 2007/0116223 A1 | 5/2007 | Burke et al. | |
| 2007/0124507 A1 | 5/2007 | Gurram et al. | |
| 2007/0132834 A1 | 6/2007 | DaPalma et al. | |
| 2007/0133507 A1 | 6/2007 | DaPalma et al. | |
| 2007/0133508 A1 | 6/2007 | DaPalma et al. | |
| 2007/0133509 A1 | 6/2007 | Da Palma et al. | |
| 2007/0133511 A1 | 6/2007 | DaPalma et al. | |
| 2007/0133512 A1 | 6/2007 | Da Palma et al. | |
| 2007/0133513 A1 | 6/2007 | Da Palma et al. | |
| 2007/0133769 A1 | 6/2007 | DaPalma et al. | |
| 2007/0133773 A1 | 6/2007 | Da Palma et al. | |
| 2007/0136420 A1 | 6/2007 | Da Palma et al. | |
| 2007/0136421 A1 | 6/2007 | DaPalma et al. | |
| 2007/0136436 A1 | 6/2007 | DaPalma et al. | |
| 2007/0136442 A1 | 6/2007 | DaPalma et al. | |
| 2007/0136448 A1 | 6/2007 | DaPalma et al. | |
| 2007/0136449 A1 | 6/2007 | DaPalma et al. | |
| 2007/0136793 A1 | 6/2007 | DaPalma et al. | |
| 2007/0147355 A1 | 6/2007 | DaPalma et al. | |
| 2007/0180075 A1 | 8/2007 | Chasman et al. | |
| 2007/0201676 A1* | 8/2007 | Gillis et al. | 379/265.01 |
| 2007/0266075 A1 | 11/2007 | Jachner | |
| 2007/0286180 A1 | 12/2007 | Marquette et al. | |
| 2007/0288247 A1 | 12/2007 | Mackay | |
| 2008/0003964 A1 | 1/2008 | Alperin et al. | |
| 2008/0037752 A1 | 2/2008 | Chatilov et al. | |
| 2008/0086564 A1 | 4/2008 | Putman et al. | |
| 2008/0167914 A1 | 7/2008 | Ikeda et al. | |
| 2008/0183852 A1 | 7/2008 | Pramer et al. | |
| 2008/0192908 A1 | 8/2008 | O'Keefe et al. | |
| 2009/0254757 A1 | 10/2009 | Toyama et al. | |
| 2010/0218084 A1 | 8/2010 | Sivadas et al. | |

FOREIGN PATENT DOCUMENTS

| | | | |
|---|---|---|---|
| EP | 1237349 | A2 | 9/2002 |
| EP | 1484903 | A2 | 12/2004 |
| FR | 2844127 | A1 | 3/2004 |
| WO | 2000005903 | | 2/2000 |
| WO | 2001031472 | | 5/2001 |
| WO | 03079144 | | 9/2003 |

OTHER PUBLICATIONS

Peterson, J., "Common Profile for Presence (CPP)," [online] Internet Engineering Task Force, IETF, CH, vol. IMPP, No. 4, Aug. 14, 2003, [retrieved on Feb. 7, 2008] retrieved from the Internet: <http://tools.ietf.org/html/draft-ietf-impp-pres-04>.

Sugano, H., et al., "Prsence Information Data Format (PIDF)," [online] Internet Engineering Task Force, IETF, CH, vol. IMPP, No. 8, May 1, 2003, [retrieved on Feb. 7, 2008] retrieved from the Internet: <http://tools.ietf.org/html/draft-ietf-impp-cpim-pidf-08>.

Schulzrinne, H., et al., "RPID: Rich Presence Extensions to the Presence Information Data Format (PIDF)," [online] Internet Engineering Task Force, IETF, CH, Jul. 1, 2006, [retrieved on Feb. 7, 2008] retrieved from the Internet: <http://www.ietf.org/rfc/rfc4480.txt>.

Notice of Allowance dated Dec. 9, 2009 in related application, U.S. Appl. No. 11/684,397.

Kimbrough, S.O., et al., "On Automated Message Processing in Electronic Commerce and Work Support Systems: Speech Act Theory and Expressive Felicity", ACM Transactions on Information Systems, vol. 15, No. 4, pp. 321-367, Oct. 1997.

Brabrand, C., et al., "The <bigwig> Project", ACM Transactions on Internet Technology, vol. 2, No. 2, pp. 79-114, May 2002.

Fielding, R.T., et al., "Principled Design of the Modern Web Architecture", ACM Transactions on Internet Technology, vol. 2, No. 2, pp. 115-150, May 2002.

Meng, H., et al., "ISIS: An Adaptive, Trilingual Conversational System With Interleaving Interaction and Delegation Dialogs", ACM Transactions on Computer Human Interaction, vol. 11, No. 3, pp. 268-299, Sep. 2004.

Keidl, M., et al., "Flexible and Reliable Web Service Execution," [online] Proc. of Workshop on Entwicklung von Anwendungen auf der Basis der XML Web-Service Technologies, retrieved from the Internet: <http://citeseerx.ist.psu.edu/viewdoc/summary?doi=10.1.1.8.8890>.

Engelsma, J., et al., Distributed Multimodal Synchronization Protocol; IETF Standard-Working Draft, Internet Engineering Task Force, IETF, CH, Jul. 8, 2005, pp. 1-71.

Georgescu, J.C., et al. "Multimodal IMS Services: The Adaptive Keyword Spotting Interaction Paradigm," [online] ICAS-ICNS 2005, Int'l Conf. Autonomic and Autonomous Systems / Int'l Conf. on Networking and Services pp. 21, 2005 [retrieved Jun. 4, 2010] retrieved from the Internet: <http://www.computer.org/portal/web/csdl/doi/10.1109/ICAS-ICNS.2005.67>.

Bodel, M., et al., "W3C Multimodal Interaction Citation," [online] May 6, 2003, pp. 1-19, XP002305381; [retrieved Jun. 4, 2010] retrieved from the Internet: <http://www.w3.org/TR/mmi-framework/>.

US Pat. No. 7706521, Office Action 1, Dec. 30, 2008.
US Pat. No. 7706521, Office Action 2, Jul. 2, 2009.
US Pub. No. 20070133773, Office Action 1, Dec. 9, 2008.
US Pub. No. 20070133773, Final Office Action 1, May 29, 2009.
US Pub. No. 20070133773, Final Office Action 2, May 21, 2010.
US Pub. No. 20070133509, Office Action 1, Dec. 10, 2008.
US Pub. No. 20070133509, Final Office Action 1, Jun. 24, 2009.
US Pub. No. 20070133513, Office Action 1, Feb. 26, 2010.
US Pub. No. 2007018957 Office Action 1 (Mar. 5, 2010).
Olsson, D., et al., "MEP—a Media Event Platform", Mobile Networks and Applications, Kluwer Academic Publishers, vol. 7, No. 3, pp. 235-244, 2002.

* cited by examiner

ENHANCING CONTACT CENTERS WITH DIALOG CONTRACTS

CROSS-REFERENCE TO RELATED APPLICATIONS

This continuation-in-part application claims the benefit of U.S. patent application Ser. No. 11/615,856 filed 22 Dec. 2006, and U.S. patent application Ser. No. 11/680,304 filed 28 Feb. 2007, both of which are hereby incorporated by reference.

BACKGROUND

1. Field of the Invention

The present invention relates to the field of contact center technologies and, more particularly, to enhancing contact centers with dialog contracts.

2. Description of the Related Art

A contact center is a functional area used by one or more organizations to handle inbound/outbound communications with customers. During a contact center interaction, a caller can be transferred from an automated response component to a contact center agent, who possesses an expertise corresponding to a caller's need (i.e., skills based routing). Often a contact center agent is paid, rewarded, or penalized based upon a quantity, a quality, and a duration of their interactions with callers. Agent monitoring components of a call center are designed to acquire and record agent specific interaction metrics.

Conventional agent monitoring techniques are unable to automatically make quality determinations. At present, agent calls are often monitored by a live supervisor who subjectively determines a quality of a communication session between the caller and the agent. Alternatively, at least a portion of agent/caller interactions are recorded, where the recordings are analyzed by a live supervisor or quality assurance technician who makes subjective determinations of quality of analyzed calls. Both of these techniques are highly deficient. First, it can be expensive and time consuming to have quality assurance personnel or supervisors analyze calls. Additionally, live monitoring by supervisors is typically performed against a minute portion of overall calls handled by a call center resulting in the deficiencies of unmonitored calls remaining undetected. Recording calls for later analysis can require large amounts of storage, computing processing power, and human agent analysis time. Further, neither technique aids in the live interaction process to guide an agent to improve quality of a live interactive session.

The problem with monitoring quality is due in part to the fact that contact agent/caller interactions are free form interactions. That is, neither party is contextually constrained, as they are when interacting through Web based forms or a scripted Interactive Voice Response (IVR) dialog. Unconstrained or free form interactions between a contact center agent and a caller can be voice-based interactions (e.g., telephone interactions), text exchange interactions (e.g., chat communications, instant messaging communications, and/or text messaging communications), multimodal interactions, or video teleconferencing interactions.

What is needed is a technique to automatically evaluate quality of a free form contact center interactions. Preferably, this technique could be implemented in a preventive manner to guide a contact center agent to improve a communication session's quality while the session is active. It would also be advantageous if the technique operated without requiring communication sessions to be recorded, which could result in significant savings related to quantities of needed computing resources.

SUMMARY OF THE INVENTION

The present invention discloses a use of dialog contracts to provide a quality measurement for contact center interactions. The dialog contracts can include a number of requirements, which are to be satisfied for a particular type of dialog session. Different types of dialog sessions can be associated with different dialog contracts. In the invention, an agent monitor program can join communication sessions between a contact center agent and a caller. This agent monitor program can analyze free form input provided by the agent and caller and can map this input to related requirements specified by the dialog contract. In one embodiment, the agent monitor can be deployed within a composite services environment and can be used regardless of whether the input was originally voice input or text exchange input. Further, the contact center can be formed from open standards based components, instead of proprietary components provided by a specific vendor. In one implementation, the contact center agent can be presented with the requirements, which are automatically updated as each requirement is fulfilled.

After a dialog session, the agent monitor program can prepare a report of the communication session, which indicates whether the dialog contract was satisfied. Agent pay, longevity, and the like can be dependent upon the prepared reports. Additionally, a supervisor can be notified (either immediately or after the fact) when the dialog contract is not being satisfied. In the case of immediate notification, the supervisor or other contact center agent can intervene into the communication session to ensure that the dialog contract is fulfilled.

The present invention can be implemented in accordance with numerous aspects consistent with the material presented herein. For example, the present solution can include a method for using dialog contracts for contract center interactions. The method can include a step of determining a context that applies to a caller who is communicating with a contact center. A dialog contract can be identified that corresponds to the determined context. The dialog contract can specify requirements for a real-time contact center session. The contact center can transfer the caller to a contact center agent. The real-time communication session can be conducted. A software program, referred to as an agent monitor, can analyze input of the caller and the contract center agent during the communication session and can automatically update a session file as requirements of the dialog contract are satisfied. The session file can be used as a quality measurement of the communication session.

Another aspect of the present invention can include a contact center system that includes a data storage area and an Action Classifier Module (ACM) engine. The data storage area can store one or more dialog contracts, wherein each dialog contract corresponds to a communication context. Each dialog contract can also include a set of data fields that are to be completed during a real-time communication session between a contact center agent and a caller. The ACM engine can map free form text input provided by the contact center agent and the caller to the data fields and values for the real-time communication sessions. A quality of the real-time communication session can be determined based upon whether the data fields of a session specific dialog contract are satisfactorily completed.

Still another aspect of the present invention can include a contact center software solution that includes an agent monitor software program. The agent monitor software program can dynamically map free form input of a contact center agent and a caller against a set of fields specified by a context specific dialog contract. The agent monitor program can automatically generate reports that indicate a quality of an associated real-time communication between the contact center agent and the caller based upon whether values have been placed in the set of fields, where the values derived from the free form input.

It should be noted that various aspects of the invention can be implemented as a program for controlling computing equipment to implement the functions described herein, or a program for enabling computing equipment to perform processes corresponding to the steps disclosed herein. This program may be provided by storing the program in a magnetic disk, an optical disk, a semiconductor memory, any other recording medium, or can also be provided as a digitally encoded signal conveyed via a carrier wave. The described program can be a single program or can be implemented as multiple subprograms, each of which interact within a single computing device or interact in a distributed fashion across a network space.

The method detailed herein can also be a method performed at least in part by a service agent and/or a machine manipulated by a service agent in response to a service request.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1A:
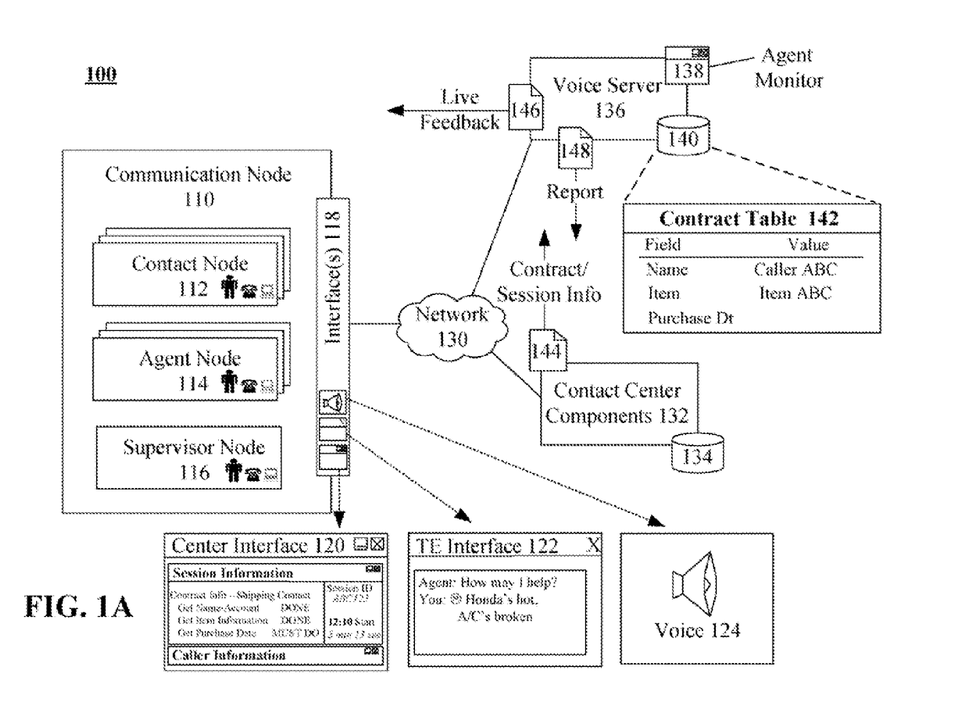
FIG. 1A is a schematic diagram of a system where a software agent monitors contact center communication sessions using dialog contracts in accordance with an embodiment of the inventive arrangements disclosed herein.

FIG. 1A is a schematic diagram of a system 100 where a software agent monitors contact center communication sessions using dialog contracts in accordance with an embodiment of the inventive arrangements disclosed herein. In system 100, a caller can access a contact center via contact node 112. During a communication session, the caller can be transferred to a call center agent, who interacts via agent node 114. A supervisor using supervisor node 116 can optionally conference into the communication session. Communications between the caller and the call center agent can be free form communications. An agent monitor 138 program can participate in the communication sessions and can be used to automatically apply a dialog contract 144 to the communication session.

In one embodiment, the agent monitor 138 can be considered a communication session participant, which is able to add content to the real-time communication session. For example, if an agent has failed to query a caller for necessary information needed to fulfill a dialog contract 144, the agent monitor program 138 can prompt (i.e., using voice output for voice based communication sessions or text output for text exchange communication sessions) the caller for the information.

The dialog contract 144 can outline numerous requirements for a communication session involving a caller and a contact center agent. The contract table 142 shows that these requirements can include fields which should be filled in with values during the communication session. For example, a dialog contract 144 relating to a product warranty action can include fields, such a caller name, an item, an item warranty identifier, and purchase date. Live feedback 146 can be provided to the contact center agent, which shows the contact center agent the requirements that must be achieved to fulfill the dialog contract 144. When the agent monitor 138 determines a requirement is met, the live feedback 146 can update a contact center interface 120 of the agent node 114 to reflect that the requirement has been fulfilled. Additionally, a session report 148 can be automatically generated by the agent monitor 138, which includes metrics related to a contact center agents' performance. The metrics can include an automatically determined quality of a communication session, which is based upon whether the dialog contract 144 was successfully fulfilled.

As shown in system 100, numerous communication nodes 110, each having one or more interfaces 118, can be communicatively linked to various contact center components 132 via a network 130. The communication nodes 110 can include the contact node 112, the agent node 114, and the supervisor node 116. The interfaces 118 can include a center interface 120, a text exchange interface 122, and a voice interface 124.

In one configuration, the agent monitor 138 can be a voice markup document, which is interpreted by voice server 136. The agent monitor 138 can store information, such as contract table 142 information contained in data store 140.

The contact center components 132 can store information in a data store 134. In one embodiment, the contact center components 132 can conform to open standards and standardized communication protocols. Each of the documents 144-148 can be formatted in accordance with open standards and can be exchanged using standardized communication protocols. Further, the contact center components 132 can be Service Oriented Architecture (SOA) components. Further still, the contact center components 132 can be components conforming to a composite services model.

As used throughout this application, open standards indicate that specifics of communication protocols, interfaces with components, and the like are published and available to third party vendors, who can construct solutions or enhancements to the open contact center by conforming to the published standards, such as Extensible Markup Language (XML), SOA, Real-time Transport Protocol (RTP), Media Resource Control Protocol (MRCP), Hyper Text Transfer Protocol (HTTP), Session Initiation Protocol (SIP), and the like. Open standards are often established by an independent standard setting body, such as the Internet Engineering Task Force (IETF), World Wide Web Consortium (W3C), etc. or by a cooperating consortium of multiple independent businesses, such as IBM, Sun Microsystems, and the like. Open standards, as used herein, can exist even through one or more companies maintains intellectual property rights to open contact center concepts, such as those presented in the instance application.

The network 130 can include any hardware/software/and firmware necessary to convey digital content encoded within carrier waves. Content can be contained within analog or digital signals and conveyed through data or voice channels. The network 130 can include local components and data pathways necessary for communications to be exchanged among computing device components and between integrated device components and peripheral devices. The network 130 can also include network equipment, such as routers, data lines, hubs, and intermediary servers which together form a packet-based network, such as the Internet or an intranet. The network 130 can further include circuit-based communication components and mobile communication components, such a telephony switches, modems, cellular communication towers, and the like. The network 130 can include line based and/or wireless communication pathways.

Each of the data stores 134 and 140 can be physical or virtual storage spaces configured to store digital content. Data stores 134 and/or data store 140 can be physically implemented within any type of hardware including, but not limited to, a magnetic disk, an optical disk, a semiconductor memory, a digitally encoded plastic memory, a holographic memory, or any other recording medium. Further, each data store 134 and 140 can be a stand-alone storage unit as well as a storage unit formed from a plurality of physical devices. Additionally, content can be stored within data stores 134 and 140 in a variety of manners. For example, content can be stored within a relational database structure or can be stored within one or more files of a file storage system, where each file may or may not be indexed for information searching purposes. Further, the data stores 134 and 140 can utilize one or more encryption mechanisms to protect stored content from unauthorized access.

Figure 1B:
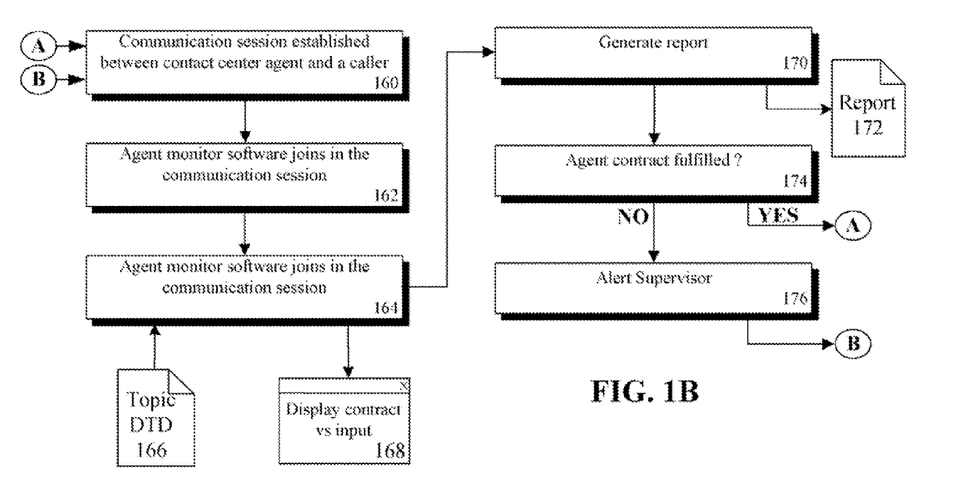
FIG. 1B is a flow chart that illustrates a method in which the agent monitor can be utilized.

FIG. 1B is a flow chart that illustrates a method in which the agent monitor 138 can be utilized. The flow chart begins in step 160, where a communication session is established between a contact center agent and a caller. In step 162, an agent monitor 138 software program can join in the communication session. In step 164, the agent monitor 138 can continually map agent input to requirements of a dialog contract 144, 166. In one embodiment, the dialog contract 144, 166 can be a Document Type Definition (DTD) based document, such as a topic DTD. Requirements of the dialog contract 144, 166 can include a formal definition of elements, structures, and rules or marking up a type of Standard Generalized Markup Language (SGML) document, such as an XML document. For example, the agent monitor 138 can put results into an XML document and can run a validating parser, which lets the DTD document detect any errors or missing data in the XML document.

The agent monitor 138 can display 168 a status of the dialog contract vs. current input in real-time during the communication session. For example, current contract status information can be displayed (via center interface 120) throughout a communication session, which can assist the agent in fulfilling the dialog contract 144, 166. In step 170, when a communication session ends, the agent monitor 138 can generate a report 148, 172 of agent performance against the DTD contract 144, 166. Using this report 148, 172 a determination can be made as to whether the agent upheld his/her end of the contract, as shown in step 174. When the contract is not satisfactorily fulfilled, a supervisor can be automatically notified, as shown by step 176. The flow chart can loop from step 174 and/or 176 to step 160, where the agent monitor 138 can execute for a different communication session.

Figure 2:
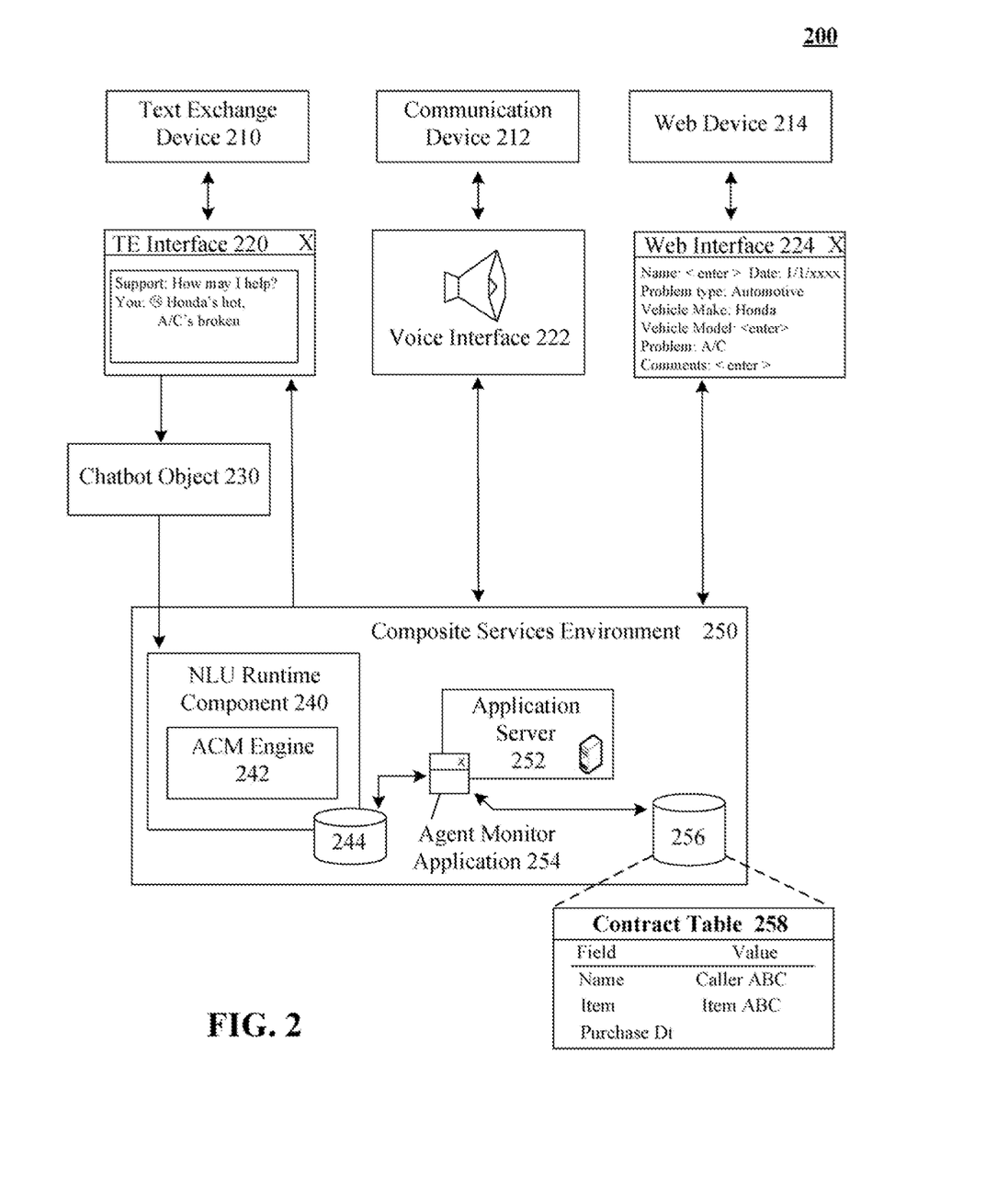
FIG. 2 is a schematic diagram of a system showing a composite service environment in which an agent monitor application can execute.

FIG. 2 is a schematic diagram of a system 200 showing a composite service environment 250 in which an agent monitor application 254 can execute. System 200 can represent one contemplated embodiment for system 100.

In system 200, a Chatbot object 230 is used to apply application context to free form input. That is, the Chatbot object 230 determines fields of the agent monitor application 254 to which free form input relates. More specifically, Natural Language Understanding (NLU) runtime component 240 can use statistical language models to determine applicable fields of a dialog contract. More specifically, the NLU component 240 can utilize Action Classifier Module (ACM) engine 242 to map input to applicable fields.

ACM engine 242 is a NLU engine that uses a set of configurable rules to predict an action based upon a free form input, such as a spoken request. The actions are the categories into which each request a caller makes can be sorted. In system 200, input is mapped to dialog contract fields, instead of automated response programmatic actions, which is conventionally the case. More formally, the ACM engine 242 embodies a conditional probability distribution over a set of outputs given an input and a state.

After this determination is made, the Chatbot object 230 can send an information update message to the application 254, which is used to update information in table 258. Table 258 updates can be conveyed to other clients 212-214 accessing agent monitor application 254. A contact center agent can utilize one or more of the clients 212-214.

In system 200, different types of devices, such as a text exchange device 210, a communication device 212, and a Web device 214, can each access agent monitor application 254 executed by application server 252 contained within environment 250 via appropriate interfaces (e.g., text exchange interface 220, voice interface 222, and Web interface 224).

The text exchange interface 220 can include any interface capable of exchanging text in real time, such as a chat interface, an instance messaging interface, and a test messaging interface. The voice interface 222 can be any interface configured for real time voice communications, such as a mobile telephone interface, communication interface of a desktop computer, a Voice over Internet Protocol (VoIP) interface, and the like. The Web interface 224 can be any interface capable of rendering markup or Web based content. For example, the Web interface 224 can be a Web browser.

The NLU runtime component 240 can use statistical models that map natural language requests (i.e., free form input) to one of many possible routing targets. In one embodiment, the statistical models can be specifically designed to handle text interface input, such as emoticons and chat slang. The routing targets of system 200 are table 258 fields. The Chatbot object 230 can be a software object containing programmatic logic designed to relate free form data to concrete model items (e.g., fields and filed values of table 258).

Figure 3:
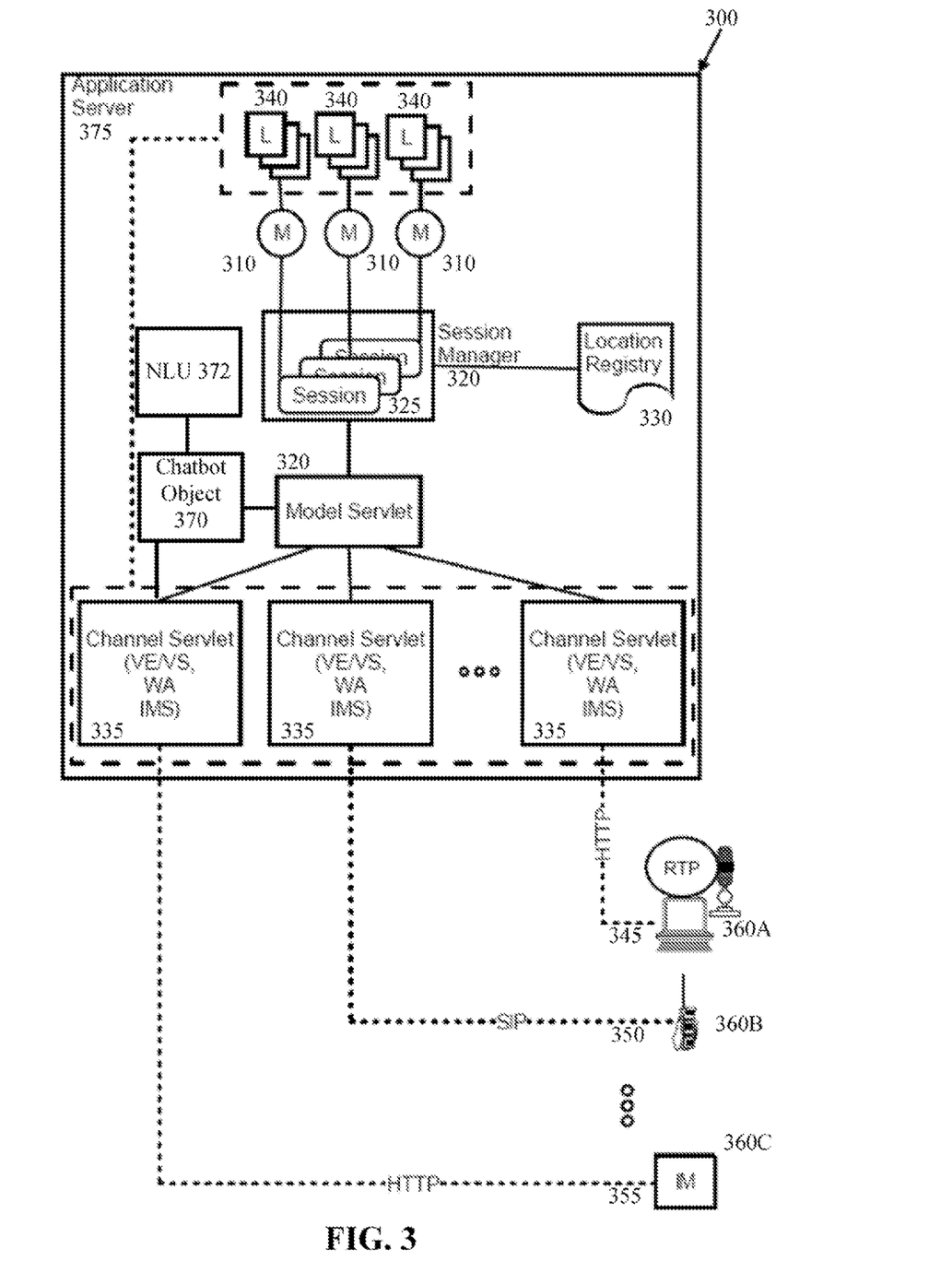
FIG. 3 is a schematic illustration of a component services environment that uses a Chatbot object to add context to contact center interactions in accordance with an embodiment of the inventive arrangements disclosed herein.

FIG. 3 is a schematic illustration of a component services environment 300 that uses a Chatbot object 370 to add context to contact center interactions in accordance with an embodiment of the inventive arrangements disclosed herein. The context an correspond to a specific dialog contract, as explained in system 100. Environment 300 is one contemplated embodiment for environment 250.

In the composite services environment 300, different channels of access to a service can be established for accessing a service through corresponding different modalities of access including voice and visual (e.g., Web and/or Text Exchange) modes. A service can be concurrently accessed by different clients using different communication channels. Additionally, free-form input (i.e., text exchange input) can be routed through a Chatbot object 370, which uses a NLU component 372 to map the input to application specific fields for a suitable application context (i.e., maps input to requirements of a dialog contract).

Specifically, interactions with a service within a communication session can be provided across selected ones of the different communication channels, each channel corresponding to a different modality of access to the service. In the case of a voice modality and a visual modality, a separate markup document an be utilized in each selected channel according to the particular modality for that channel.

Importantly, each channel utilized for accessing a service within a session can be associated with each other channel accessing the service within the same session. In consequence, the state of the service—stored within a model in a model-view-controller architecture—can be maintained irrespective of the channel used to change the state of the service. Moreover, the representation of the service can be synchronized in each view for the selected ones of the different channels. As such, an end user can interact with the service in a single session across different channels of access using different modalities of access without requiring burdensome, proprietary logic deployed within a client computing device.

As illustrated, composite services can operate in an application server 375 and can include multiple channel servlets 335 configured to process communicative interactions with corresponding sessions 325 for a composite multimedia service over different channels of access 345, 350, 355 for different endpoint types 360A, 360B, 360C in a communication network. In this regard, the channel servlets 335 can process voice interactions as a voice enabler and voice server to visual endpoint 360A incorporating a voice interface utilizing the RTP and HTTP, or a voice endpoint 360B utilizing SIP. Likewise, the channel servlets 335 can process visual interactions as a Web application to a visual endpoint. As yet another example, the channel servlets 335 can process instant message interactions as an instant messaging server to an instant messaging endpoint 360C.

More specifically, the channel servlets 335 can be enabled to process HTTP requests for interactions with a corresponding session 325 for a composite multimedia service. The HTTP requests can originate from a visual mode oriented Web page over a visual channel 345, from a visual mode oriented text exchange interface over a text exchange channel 355, or even in a voice mode over a voice channel 350 enabled by SIP. When interactions occur over channel 355, Chatbot object 370 can provide context using NLU component 372, as detailed in system 200. The channel servlets 335 can be enabled to process SIP requests for interactions with a corresponding session 325 for a composite multimedia service through a voice enabler which can include suitable voice markup, such as Voice XML and call control extensible markup language (CCXML) coupled to a SIPlet which, in combination, can be effective in processing voice interactions for the corresponding session 325 for the composite multimedia service, as it is known in the art.

Each of the channel servlets 335 can be coupled to a model servlet 320. The model servlet 320 can mediate interactions with a model 310 for an associated one of the sessions 325. Each of the sessions 325 can be managed within a session manager 320 which can correlate different channels of communication established through the channel servlets 335 with a single corresponding one of the sessions 325. The correlation of the different channels of communication can be facilitated through the use of a coupled location registry 330. The location registry 330 can include a table indicating a host name of systems and channels active for the corresponding one of the sessions 325.

The model servlet 320 can include program code enabled to access a model 310 for a corresponding session 325 for a composite multimedia service providing different channels of access 345, 350, 355 through different endpoints 360A, 360B, 360C. For instance, the model 310 can be encapsulated within an entity bean within a bean container. Moreover, the model 310 can store session data for a corresponding one of the sessions 325 irrespective of the channel of access 345, 350, 355 through which the session data for the corresponding one of the sessions 325 is created, removed or modified.

Notably, changes in state for each of the sessions 325 for a composite multimedia service can be synchronized across the different views 360 for the different channels of access 345, 350, 355 through a listener architecture. The listener architecture can include one or more listeners 340 for each model 310. Each listener can correspond to a different channel of access 345, 350, 355 and can detect changes in state for the model 310. Responsive to detecting changes in state for the model 310 for a corresponding one of the sessions 325 for a composite multimedia service, a listener 340 can provide a notification to subscribing view 360 through a corresponding one of the channel servlets 335 so as to permit the subscribing views 360 to refresh to incorporate the detected changes in state for the model 310.

Figure 4:
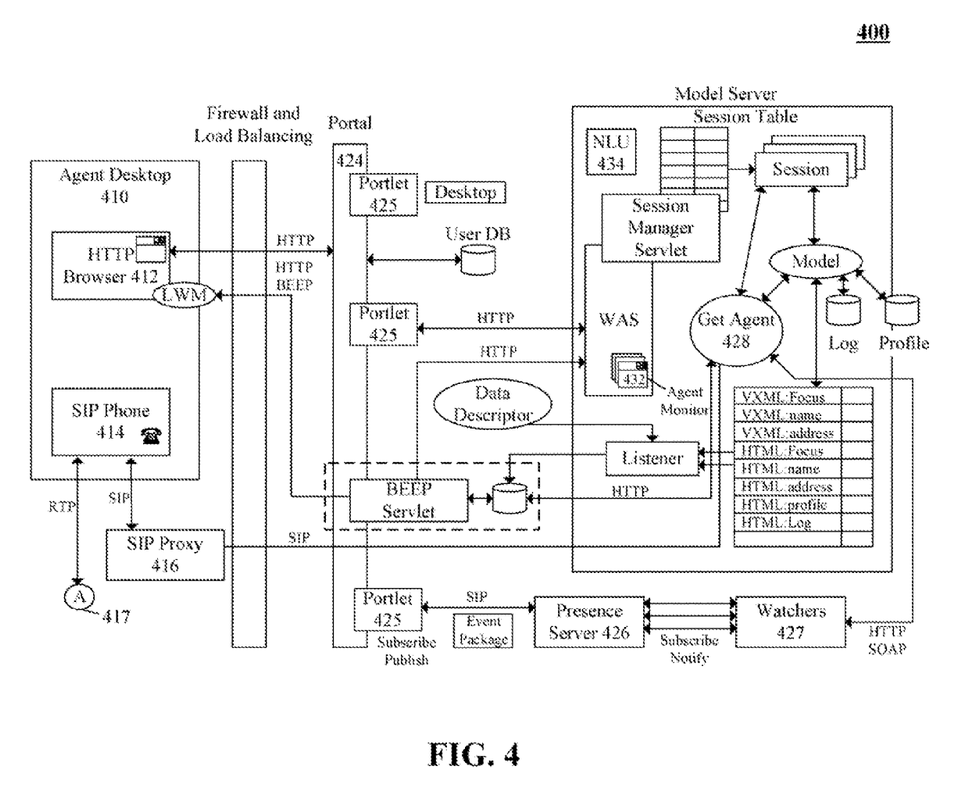
FIG. 4 is a schematic diagram of a standards based contact center from an agent perspective that is implemented using WEBSPHERE enabled components and associated tooling in accordance with an embodiment of the inventive arrangements disclosed herein.

FIG. 4 is a schematic diagram of a standards based contact center 400 from an agent perspective that is implemented using WEBSPHERE enabled components and associated tooling in accordance with an embodiment of the inventive arrangements disclosed herein. Center 400 represents one particular embodiment for system 100. It should be noted that center 400 utilizes WEBSPHERE enabled components for illustrative purposes only and the scope of the invention is not to be construed as limited in this regard. Other middleware solutions and open standards based solutions can be substituted and adapted to achieve approximately equivalent results.

An illustrative scenario for center 400 can show how the components interact. In this scenario, a call can come in over a telephone to the contact center 400 using a standard telephone, where the call is transferred to an agent connected to contact center components using agent desktop 410. The agent can utilize any personal computer in an operations center as the agent desktop 410 and is not constrained to a particular station. The agent can also remotely (i.e., external to an operations center, such as through a home computer) connect to contact center components using a Web browser 412 and SIP based telephone 414. The agent can sign onto portal 424 via an agent desktop portlet 425. For example, the agent can enter a user id and password and hit a SUBMIT button.

The desktop agent 410 portlet can call the WEBSPHERE PRESENCE SERVER (WPS) 426 with a publish/subscribe mechanism. An IP address of the agent's SIP phone 414, browser 412, BEEP address, and other information including agent expertise and agent utilization can be conveyed to the presence server 426. After login onto the system, a default screen can be presented in the browser 412 that indicates that the agent is active and available.

Figure 5:
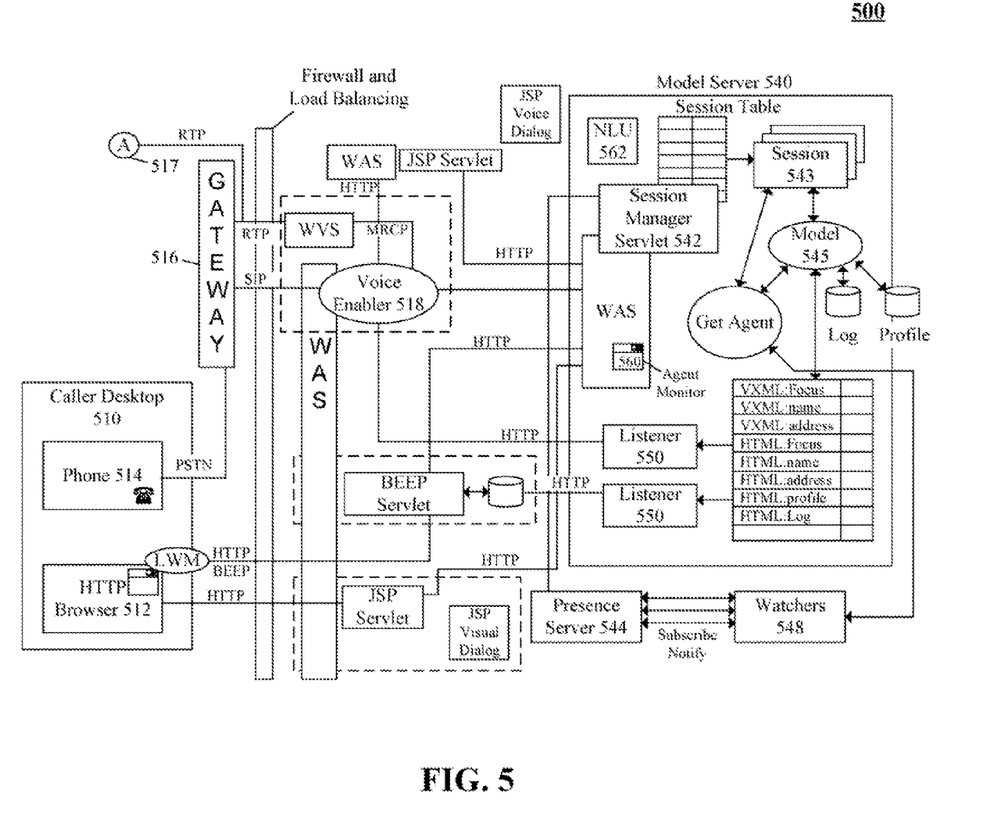
FIG. 5 is a schematic diagram of a standards based contact center from a customer perspective that is implemented using WEBSPHERE enabled components and associated tooling in accordance with an embodiment of the inventive arrangements disclosed herein.

At this time, a call between a caller on a phone and the contact center 400 can be active. In a running VXML application, the VE can prompt a user for input. The VE can interact with the WEBSPHERE VOICE SERVER to determine user context information and a purpose of a call. This context can be mapped to a corresponding dialog contract. The caller responses can indicated that agent assistance is needed. For example, a caller can select a dialog option to speak with a live agent. The VXML application can transfer the caller to an agent transfer servlet co-located with the SIP proxy 416. Connector A (417), which continues in FIG. 5, illustrates this connection. Once the transfer is made, the agent can receive the call using the SIP phone 414 and can receive caller specific data via the browser 412.

Two key services used to allocate an agent to a caller are skills based routing and queuing. The presence server 426 allows a rules-based service in the assignment of registered agents based upon rich presence information. The watchers 427 along with network dispatcher load balancing allow for rule based services in the queuing a distribution of call requests. The VE in conjunction with SIP information can provide the necessary information for the get agent 428 service.

The agent monitor 432 application can be active during the communication session. It can use NLU component 434 to map free form input of the agent and/or the caller to a dialog contract. Real time feedback and specifics of the dialog contract can be proved to the agent via agent desktop 410. This feedback ensures the agent is aware of communication session requirements and directs communications accordingly.

FIG. 5 is a schematic diagram of a standards based contact center 500 from a customer perspective that is implemented using WEBSPHERE enabled components and associated tooling in accordance with an embodiment of the inventive arrangements disclosed herein. Center 500 represents one particular embodiment for system 100. It should be noted that center 500 utilizes WEBSPHERE enabled components for illustrative purposes only and the scope of the invention is not to be construed as limited in this regard. Other middleware solutions and open standards based solutions can be substituted and adapted to achieve approximately equivalent results.

An illustrative scenario for center 500 can show how the components interact. In this scenario, a caller can use caller desktop 510 to telephone a contact center using a standard phone 514 and/or can communicate using a browser 512 (e.g., chat, text messaging, Web forms, or other form of interaction). The scenario can begin when the caller phones the contact center using phone 514. The call can come in over a PSTN connection and can be sent to a VoIP/media gateway 516. From there, the call can pass through a WAS SIP proxy as a SIP INVITE message, which is forwarded to the VE 518. The VE 518 can inform the composite services model server 540 (i.e., over a HTTP communication) that a new call session has started.

A session manager servlet 542 can call an IM presence server 544 to determine capabilities (e.g., clients/modalities) of the caller desktop 510 (assuming the desktop 510 has been authenticated) and to acquire IP address and protocol types (e.g., SIMPLE for IM, HTTP for browser 512) of the desktop 510. This obtained information can be stored in the model server (MS) 540 along with the VE 518 IP hostname for this call/session 543. An associated model 545 can also be updated based upon previously stored information (e.g., name and address information can be previously logged from a prior session).

The session manager servlet 542 can then set a voice channel as active in the IMS presence server 544. Activation indicates that the caller's phone 514 is being utilized and is not just available. The presence server 544 can set a watcher 548 for an event package on a person. The MS 540 can add a listener 550 for voice modality hooks to point to the VE 518 hostname for XML Configuration Access Protocol (XCAP) messages. Triggers can be established for all values for which the listener 550 is listening. All appropriate listening information and associated triggers can be sent to the VE 518.

At this point, model 545, session 543, and presence server 544 settings have been set to values associated with a live call. One of these values can include focus, which can be set to synchronize HTTP and VXML focus. The caller can now interact with the contact center 500, providing responses to automated prompts. These responses can result in a transfer (illustrated by Connector A (517)) to a live agent, details for which are provided in FIG. 4. During these interactions, the agent monitor 560 can map input to a dialog contract using NLU component 562.

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A method for using dialog contracts for contact center interactions comprising:
   determining a context that applies to a caller who is communicating with a contact center;
   identifying a dialog contract that corresponds to the determined context, said dialog contract specifying requirements for a real-time free form communication session, the requirements including input requirements for both the caller and a contact center agent;
   the contact center transferring the caller to a contact center agent;
   conducting the real-time free form communication session involving the caller and the contact center agent;
   a software program analyzing input of the caller and the contact center agent during the real time free form communication session and automatically updating a session file as requirements of the dialog contract for both the caller and the contact center agent are satisfied; and utilizing the session file as a quality measurement of the communication session.

2. The method of claim 1, wherein the dialog contract is established using a Document Type Definition (DTD) document.

3. The method of claim 1, wherein the software program is written in a Voice XML based language.

4. The method of claim 1, wherein the analyzed input is free form input, and wherein a Natural Language Understanding (NLU) engine is used to map the input to the requirements of the dialog contract.

5. The method of claim 1, further comprising:
providing live feedback to the contact center agent during the real time free form communication session, said live feedback indicating the requirements of the dialog contract and whether each of these requirements has been satisfied.

6. The method of claim 5, further comprising:
presenting the live feedback within a commercial off-the-shelf Web browser used by the contact center agent, wherein the Web browser communicates with the contact center over a standard Internet Protocol based network using standard communication protocols.

7. The method of claim 1, further comprising:
the contact center processing the session file to determine whether the dialog contract was satisfied; and
when the processing step determines that the dialog contract is not satisfied, automatically notifying at least one of the contact center agent and a supervisor of the contact center agent of this fact.

8. The method of claim 1, wherein the contact center agent and the caller communicate during the real-time free form communication session using a voice modality.

9. The method of claim 1, wherein the contact center agent and the caller communicate during the real-time free form communication session using a text exchange modality.

10. The method of claim 1, wherein the software and hardware of the contact center is based upon open standards, which permit the contact center to operate without reliance on proprietary communication protocols, without reliance upon proprietary, vendor-specific contact center hardware, and without reliance upon vendor-specific contact center software.

11. A contact center system for comprising:
a data storage area configured to store a plurality of dialog contracts, wherein each dialog contract corresponds to a communication context, and wherein each dialog contract includes a plurality of data fields that are to be completed in a contract table during a real-time communication session between a contact center agent and a caller, wherein the data fields correspond to input requirements for both the caller and the contact center agent, the contract table being separately stored from the dialog contract, wherein a Natural Language Understanding (NLU) engine is configured to map in real time free form text input provided by the contact center agent and the caller to the data fields and values for the real-time communication sessions in the contract table, wherein a quality of the real-time communication session is determined based upon whether the data fields of a session specific dialog contract are satisfactorily completed in the contract table.

12. The system of claim 11, wherein data storage area is a storage area of a composite services environment in which a composite services application executes, said composite services application being a contact center application.

13. The system of claim 11, wherein the data storage area and the Natural Language Understanding (NLU) engine are components of a contact center, wherein the software and hardware of the contact center is based upon open standards, which permit the contact center to operate without reliance on proprietary communication protocols and without reliance upon proprietary, vendor-specific contact center hardware.

14. The contact center system of claim 11, further comprising:
a commercial off-the-shelf Web browser used by the contact center agent, wherein the Web browser communicates with a contact center over a standard Internet Protocol based network using standard communication protocols, wherein the Natural Language Understanding (NLU) engine and the data storage area are components of the contact center, and wherein during the real-time communication session the data fields and values associated with the dialog contract are presented and are updated live as the free form input is mapped to the data fields.

15. A computer program product for a contact center software solution including computer program code stored in a non-transitory medium and comprising:
computer program code for an agent monitor software program configured to dynamically map free form input of a contact center agent and a caller during communication between the contact center agent and the caller against a set of fields specified by a context specific dialog contract, the fields corresponding to input requirements of the dialog contract for both the caller and the contact center agent, wherein the agent monitor program automatically generates reports that indicate a quality of an associated real-time communication between the contact center agent and the caller based upon whether values have been placed in the set of fields, wherein the values are derived from the free form input.

16. The computer program product for a contact center software solution of claim 15, further comprising:
computer program code for a Natural Language Understanding (NLU) engine that is used when dynamically mapping the free form input against fields of the dialog contract.

17. The computer program product for a contact center software solution of claim 15, wherein the agent monitor software program is configured to automatically notify a contact center supervisor whenever the agent monitor software program determines an agent's performance is unsatisfactory, wherein unsatisfactory performance consists of at least one of the contact center agent completing the real-time communication without providing values for at least one of the fields and the agent monitor software program predicting that the contact center agent will not satisfy conditions of the dialog contract before the real-time communication session completes.

18. The computer program product for a contact center software solution of claim 15, wherein the real-time communication session is a text-exchange communication, and wherein the agent monitor software program interjects comments prompting the caller to provide values for at least one of the fields.

19. The computer program product for a contact center software solution of claim 15, wherein the agent monitor software program is considered an entity participating in the real-time communication session, which includes the caller, the contact center agent, and the agent monitor software program.

20. The computer program product for a contact center software solution of claim 15, wherein the agent monitor software program is configured to automatically generate a report for the real-time communication session that indicates whether the dialog contract was satisfied, wherein the report is used by a contact center for at least one of agent compensation and client billing.

* * * * *